Figure 14:
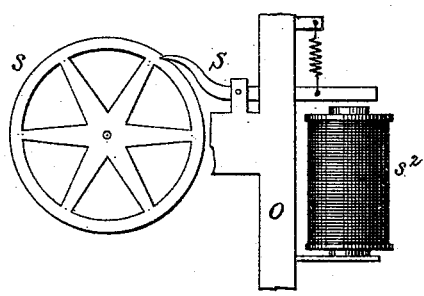

(No Model.) 5 Sheets—Sheet 1.
H. ST. C. WAIT.
ELECTRIC RAILWAY SIGNAL.
No. 492,645. Patented Feb. 28, 1893.
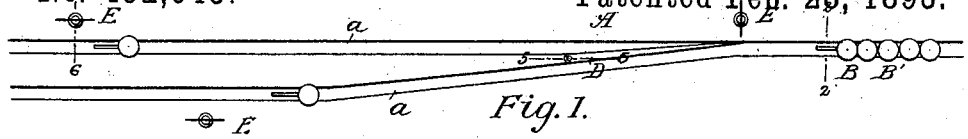
Fig. 1.
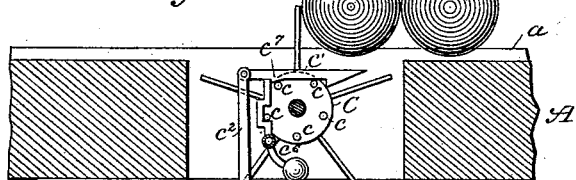
Fig. 2.
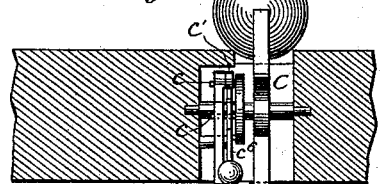
Fig. 3.
Fig. 4.
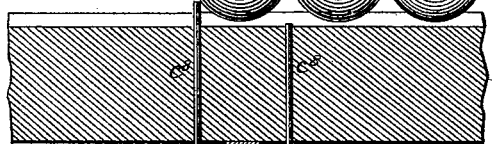
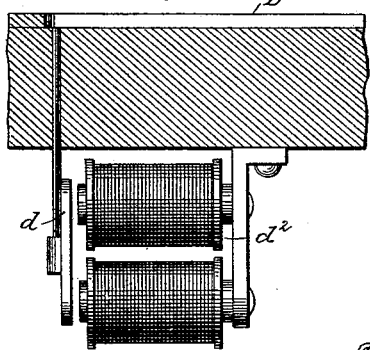
Fig. 5.
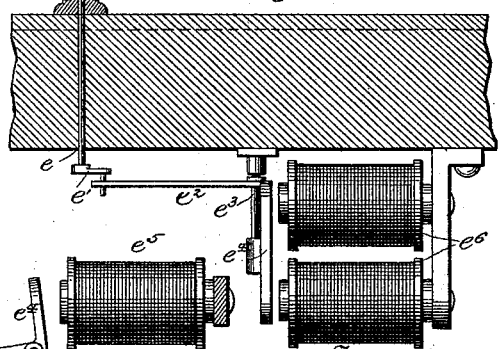
Fig. 6.
Fig. 7.
Witnesses
Raymond F. Barnes.
Fabius F. Elmore.
Inventor
H. St. C. Wait
By P. T. Dodge
Attorney
THE NORRIS PETERS CO., PHOTO-LITHO., WASHINGTON, D. C.

(No Model.)  H. ST. C. WAIT.  5 Sheets—Sheet 2.
ELECTRIC RAILWAY SIGNAL.
No. 492,645.  Patented Feb. 28, 1893.
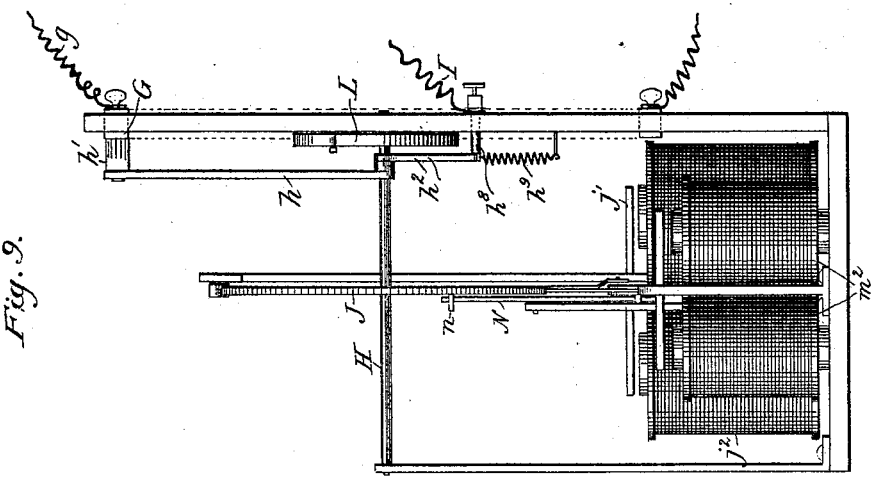
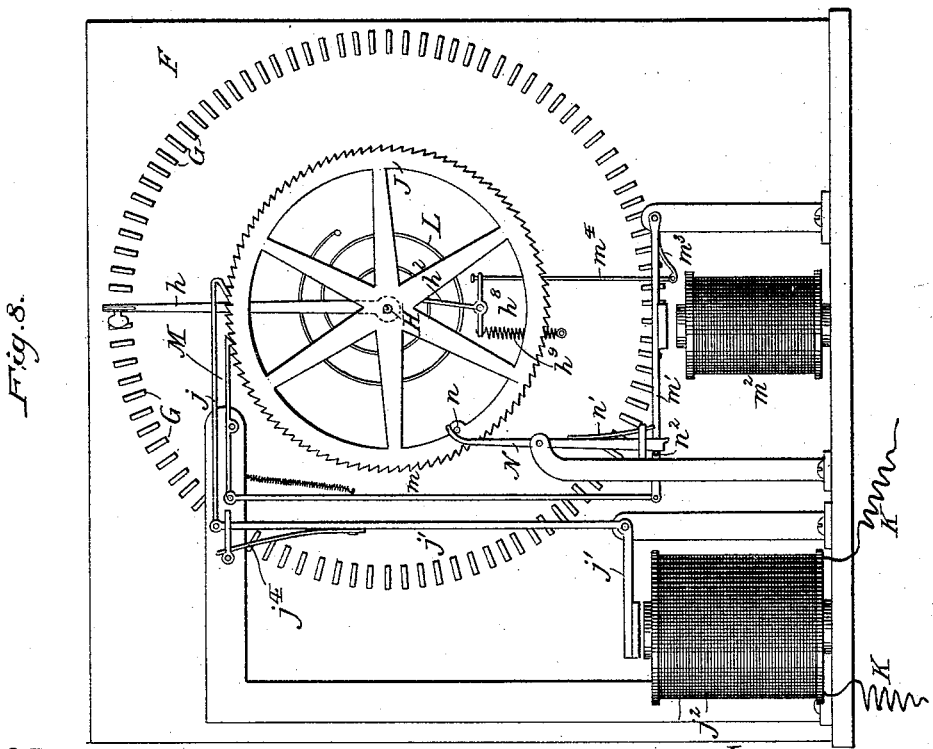

(No Model.) 5 Sheets—Sheet 3.
H. ST. C. WAIT.
ELECTRIC RAILWAY SIGNAL.
No. 492,645. Patented Feb. 28, 1893.
*Fig. 10.* *Fig. 11.*
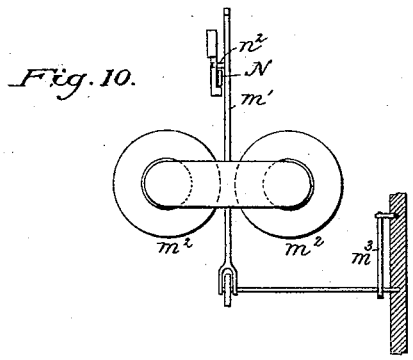
*Fig. 12.* *Fig. 13.*
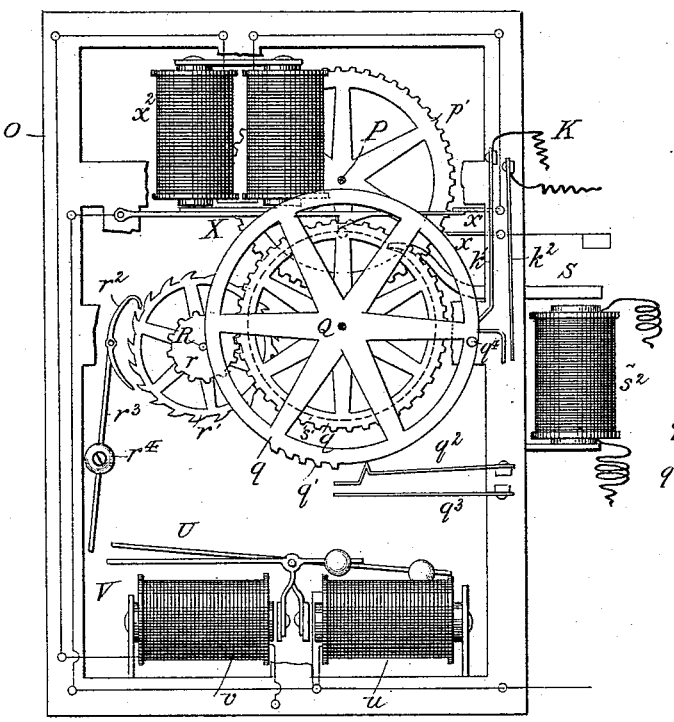
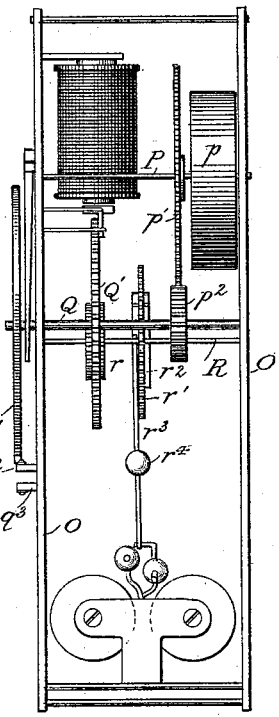
Witnesses: Inventor:

(No Model.) 5 Sheets—Sheet 4.

H. ST. C. WAIT.
ELECTRIC RAILWAY SIGNAL.

No. 492,645. Patented Feb. 28, 1893.

Witnesses:
W. W. Mortimer
Fabius J. Elmor

Inventor:
H. St. C. Wait
By P. T. Dodge
Atty.

(No Model.) H. ST. C. WAIT. 5 Sheets—Sheet 5.
ELECTRIC RAILWAY SIGNAL.
No. 492,645. Patented Feb. 28, 1893.

UNITED STATES PATENT OFFICE.

HOWARD ST. CLAIR WAIT, OF NEW YORK, N. Y.

ELECTRIC RAILWAY-SIGNAL.

SPECIFICATION forming part of Letters Patent No. 492,645, dated February 28, 1893.

Application filed August 11, 1891. Serial No. 402,316. (No model.)

*To all whom it may concern:*

Be it known that I, HOWARD ST. CLAIR WAIT, of New York, in the county of New York and State of New York, have invented certain Improvements in Electric Railway-Signals, of which the following is a specification.

The aim of my invention is to facilitate the management of railways by enabling the official in charge of each section of a road to see at a glance the position of all the switches, signals and trains thereon. To this end I divide the section of the road into shorter lengths or blocks and provide at any convenient point an apparatus, hereinafter termed the "indicator," containing a miniature representation of the road with movable devices representing the switches, signals and trains. The movement of these devices is effected by electro-magnets in circuits controlled through local devices termed "signal boxes," by the movements of the switches, signals and trains on the road; so that when a signal or a switch is moved from one position to another, or a train advanced from one block in the section to the next a corresponding movement will take place on the indicator. Now if each of the magnets of the indicator were connected by a separate wire with its signal box the multiplicity of wires would render the apparatus impracticable. I, therefore, provide a switching mechanism hereinafter termed the "multiple switch," through which the various magnets of the indicator may be connected, one at a time, with a single wire extending over the section of the road to be indicated, and connected with the various signal boxes thereon. This wire I term the "signal wire." The signal boxes and the multiple switch are also connected by a second wire in another circuit called the "impulse wire," the function of which is to operate the multiple switch in such manner that the signal wire will be connected with the corresponding magnet of the indicator.

From the foregoing it will be seen that my system comprises three distinct co-operating mechanisms. First, the indicator; second, the multiple switch; and, third, the signal boxes with appliances through which they are actuated by the movements of the trains, switches and signals. These will be separately described in the order named, and their connections with each other explained thereafter.

Figure 15:
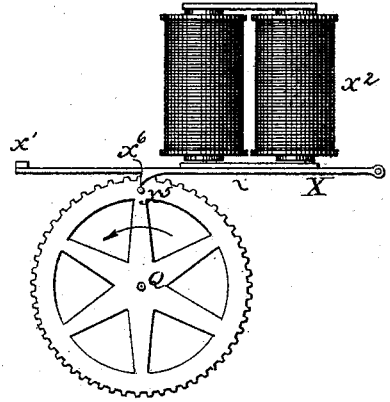
Figure 16:
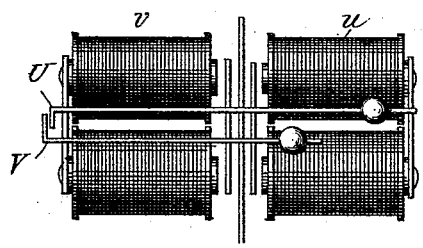

In the accompanying drawings,—Figure 1 is a plan view representing in outline the indicator. Fig. 2 is a longitudinal vertical section on the line 2—2 showing the details of the train indicating mechanism. Fig. 3 is a cross-section on the line 3—3 showing the same mechanism. Fig. 4 is an elevation representing a modified form of the train indicator. Fig. 5 is a vertical section on the line 5—5, showing the details of the switch indicator. Fig. 6 is a vertical section on the line 6—6 of Fig. 1, showing the details of the signal indicator. Fig. 7 is a top plan view of the magnet and connections shown in the preceding figure. Fig. 8 is a front elevation showing in outline the multiple switch. Fig. 9 is a side elevation of the same. Figs. 10 and 11 are details of the same hereinafter described. Fig. 12 is a front elevation showing the internal mechanism of a signal box. Fig. 13 is an edge view of the same. Fig. 14 is a view showing the detent by which the signal box is stopped and started. Fig. 15 is a detail view of one of the switch-controlling devices. Fig. 16 is a top plan view of the non-interference magnets and their connections. Figs. 17 to 21 are views of devices used to effect the starting of the signal boxes by the trains, switches and signals. Fig. 22 is a diagram illustrating the system as a whole.

*The indicator.*

Referring to Figs. 1 to 7, A represents a flat longitudinally inclined bed or table, having therein one or more grooves $a$, which represent the track or tracks of the road with the branches or side tracks leading from the main line, and divided into lengths or blocks to correspond with those of the road.

B B' are a series of balls which represent the trains and which being placed in the upper end of the groove are allowed to roll downward therethrough from section to section in order to indicate the corresponding progress of the trains over the road. At each of the points where the balls are to be arrested I provide an escapement mechanism, such as shown in Fig. 2, consisting of a vertically-revolving wheel, C, mounted in a slot in the bed, and provided with radial arms so arranged that as the wheel is turned step by step the arms will permit the passage of the balls one at a time. This wheel is provided on its side with pins $c$, and is turned forward intermittingly by a pawl, $c'$, engaging the pins, and carried by an armature lever, $c^2$, which is pivoted at its lower end at $c^3$, and subjected to the influence of an electro-magnet $c^4$, and a retracting spring, $c^5$. When the magnet is excited it attracts the lever and causes the pawl $c'$ to turn the escapement wheel forward sufficiently to effect the delivery of one ball. In order to prevent the wheel from revolving too far a notched stop-arm, $c^6$, pivoted at its middle and weighted at its lower end is arranged to engage the pins on the wheel. The upper end of this stop-arm lies in the path of a beveled shoulder, $c^7$, on the pawl $c'$, so that as the pawl begins its forward movement it acts first to disengage the stop-arm from the pin, and thereby releases the wheel so that it may be turned by the continued movement of the pawl. As the pawl completes its movement its shoulder is carried beyond the upper end of the stop-arm which returns to its original position and again locks the wheel.

It is to be understood that the escapement mechanism above described is but one of many which may be used. Any electrical operating device which will control the movement of the balls over the table is to be considered the equivalent of the escapement above described. In Fig. 4 I have represented one of these equivalent constructions consisting of two stop-pins $c^8$, projected vertically through the table and connected thereunder to opposite ends of a centrally-pivoted armature lever, $c^9$, subject to the influence of the electro-magnet, $c^4$, and retracting spring $c^5$, whereby the pins are thrust above the table alternately, thus permitting the balls to pass one at a time.

In order to show the position of the switches on the road I prefer to employ in the indicator miniature switches, D, turning on vertical pivots between the main groove in which the balls travel and the side grooves, as shown in Fig. 1. Thus mounted these miniature switches serve not only to indicate the position of the switches on the road but also to deflect the balls representing the trains from the main groove into the side grooves, thus causing the balls to pursue in the indicator courses corresponding to those of the trains on the road.

As shown in Figs. 1 and 5, the vertical pivot of the switch D, is extended downward through the bed or table and attached at its lower end to the middle of an armature, $d'$, the opposite ends of which are subject to the attraction of two electro-magnets $d^2 d^3$, which are alternately excited, and which act to throw the switch to and fro.

In order to give the position of the signals on the road I prefer to provide the indicator with miniature signals E, such as shown in Figs. 1, 6 and 7, with a vertical shaft $e$ extended down through the table and provided at the lower end with a crank, $e'$, seated in the slotted end of a lever, $e^2$, turning on a vertical pivot, $e^3$, and provided with a cross-armature, $e^4$, the ends of which are in the field of electro-magnets $e^5$ and $e^6$, respectively, so that these magnets, acting alternately, serve to throw the signal from one position to another.

It will be obvious to the skilled mechanic that the devices respresenting the switches and signals in the indicator may be modified in form and construction, the only requirement being that they shall be electrically operated, and of such character as to plainly indicate to the observer the position of the switches and signals on the road.

It will be seen that the indicator provided with the various appliances above described is in effect a representation of the entire section of the road, on a small scale, and that the observer is enabled to note instantly not only the position of each train and each signal, but the position of the switches controlling the further movements of the trains.

The multiple switch.

Referring to Figs. 8 to 11, F represents a rigid frame which may be of any appropriate form and construction adapted to sustain the operative parts. The frame as shown in the drawings, consists principally of front and back vertical plates attached to a suitable base. In the back plate are mounted a series of insulated contact points, G, arranged in a circle and each communicating through a wire, $g$, with one of the magnets of the indicator.

H is a horizontal shaft mounted in the frame, and carrying at one end an insulated conducting-arm $h$, having at its end a spring conducting finger, $h'$, arranged to be carried by the revolution of the arm over the series of contact points so that it may establish connection with them one at a time. This rotary conducting-arm $h$, has a hub upon which there rests a pivoted conducting finger, $h^2$, connected with the signal wire I, before referred to, so that the current entering from the signal-box passes through the finger $h^2$, to the rotary arm $h$, and thence outward through one of the contacts G, to the appropriate magnet of the indicator. The rotation of the arm $h$ step by step is effected by a wheel, J, fixed on the shaft H, and having teeth corresponding in number with the contact points G. The wheel is engaged by a pawl, $j$, on the upper end of an angular lever, $j'$, pivoted to the main-frame and provided with an armature in the field of electro-magnet $j^2$, to which the impulse wire K, before referred to from the signal boxes, is connected. Each impulse sent through the magnet $j^2$ causes it to operate the pawl $j'$, and thereby turn the arm $h$ so as to carry its finger forward from the contact point on which it rests to the next. When the magnet $j^2$, is passive the pawl $j$ is returned to its original position by spring $j^4$. The rotation of the wheel by the pawl is resisted by a coiled spring, L, attached at one end to the shaft and at the other to a fixed support. The second pawl M, engages the wheel, however, and holds the same during the retrograde movement of the driving pawl. After the conducting arm $h$ has been drawn forward to the required point, and the signal transmitted thereto the pawls must be disengaged in order that the arm may be turned backward to its original and normal position by the spring L. To this end the pawl M is pivoted near its middle and connected at its rear end by rod $m$, to an armature lever, $m'$, acted upon by an electro-magnet, $m^2$. When the magnet attracts the lever the pawl M is raised out of engagement with the wheel J and acts in turn to lift the driving-pawl $j$ out of engagement thus releasing the wheel so that it is instantly turned backward by the spring to its first position.

In order to prevent the possibility of a signal being transmitted through the arm $h$ to the indicator during the backward rotation of the arm the armature-lever $m'$, is provided with a crank-arm, $m^3$, which is connected by rod $m^4$, to the conducting finger $h^2$. This finger is pivoted at $h^8$, and held in contact with the hub of the arm $h$ by a spring, $h^9$. When, therefore, the magnet depresses the arm $m'$, to disengage the pawls it acts at the same time through the connection $m^4$, to throw the conducting finger $h^2$ out of contact with arm $h$, thus interrupting the signal circuit to the indicator.

In order that ample time may be allowed for the return of the conducting arm $h$, to its initial position, notwithstanding any interruption of the current through the magnet $m^2$ I pivot to the frame a lever N, the upper end of which stands in the path of a stud, $n$, on wheel J, while its lower end urged laterally by a spring, $n'$, is arranged to automatically engage over a pin, $n^2$, on the side of the armature-lever $m'$, when the latter is depressed so that the lever is automatically locked in position to hold the pawls out of action. As the arm and the wheel J, complete their backward rotation the stud $n$ encounters the upper end of lever N, and disengages the same from the armature thus allowing the conducting finger $h^2$, to re-establish the circuit and the two pawls to re-engage the wheel.

Each signal box is adapted, as hereinafter explained, to transmit a distinctive number of impulses over the wire K to the magnet $j^2$. The effect of these impulses through the magnet $j^2$, is to place the arm $h$, in communication with that particular magnet of the indicator which corresponds with the signal box. If, therefore, a box is actuated by the movement of a switch, a signal or a train, the corresponding device on the indicator and no other is actuated.

*The signal boxes.*

In order that the signals, switches and trains may automatically transmit the requisite number of impulses to the multiple switch mechanism to set the same in the required position and thereafter transmit the signal impulse, I provide at appropriate points along the road devices which for convenience I term "signal boxes." These boxes except as to the number of impulses which they are adapted to send may be constructed in duplicate, but the adjunctive devices for starting them will be varied according to the positions in which they are used.

Referring to Figs. 12 and 13, O represents a frame consisting principally of vertical front and back plates suitably connected by pillars or otherwise.

P is a horizontal driving-shaft provided with a driving spring, $p$, and winding devices after the manner of an ordinary clock mechanism, or if preferred with a weighted cord and drum to effect its rotation. This driving-shaft carries a large gear wheel, $p'$, driving a pinion, $p^2$, on a second shaft, Q, carrying a gear-wheel, $q$, which engages a pinion, $r$, on a shaft, R, which also carries an escapement wheel, $r'$, engaged by a pallet, $r^2$. The wheel and pallet are similar to those ordinarily used in clock movements, and the pallet is provided with a depending arm, $r^3$, having an adjustable weight, $r^4$. These devices serve to retard or limit the speed, the gear train and its connections. The driving spring is kept normally under tension but the train prevented from operating by a detent lever, S, pivoted to the frame, as shown in Figs. 12 and 14, and arranged to engage a notch in the periphery of wheel, $s$, fixed to the shaft Q, so that if the lever S, be momentarily disengaged the shaft Q will be permitted to make one revolution. On the end of the shaft, Q, I mount a signal wheel, $q$, having on its periphery a distinctive number of projections $q'$, arranged to act upon a conducting finger, $q^2$, and forcing the same downward into contact with a second finger, $q^3$. These fingers form portions of the impulse circuit leading to the magnet $j^2$, of the multiple switch so that each tooth of the wheel $q$ acts to turn the conducting arm $h$ of the multiple switch forward from one contact point to the next. Assuming therefore, that the wheel $q$ carries five points it will act to advance the conducting arm of the multiple switch five steps and leave it in contact with the fifth point from the place of starting, thus establishing the proper connection for the transmission of the signal to the appropriate magnet of the indicator. The signal wheel $q$ carries also a pin, $q^4$, which acts to force a conducting finger $k'$, into contact with a conducting finger, $k^2$, these fingers forming part of the signal circuit K leading through the conducting-arm H of the multiple switch and thence to the indicator as before explained. The position of the signaling pin $q^4$, upon the wheel is such that the points $q'$, transmit the signals to set the multiple switch before the pin $q^4$, acts to transmit the signal impulse.

Figure 17:
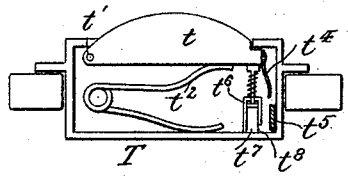
Figure 18:
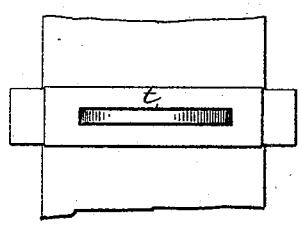

The signal box stands normally in the position shown in Fig. 12, with both the signal circuit and the impulse circuit open. The disengagement of the detent S to start the box may be effected either by mechanical or electrical connection with the signal, the switch or the passing trains. In order however, to avoid the shocks and strains attending the use of devices mechanically operated by the train I prefer to actuate the detent S, as shown in Figs. 12 and 14, by an electro-magnet, $s^2$, in a local circuit controlled by devices such as shown in Figs. 17 and 18, or equivalent devices adapted to be operated by passing trains. In the form shown this circuit-controlling or starting device consists of a stationary casing, T, arranged adjacent to the track rails and containing a plate, $t$, mounted on a horizontal pivot, $t'$, and sustained by a spring, $t^2$. The plate is arranged in position to be depressed by the flanges of the passing car wheels or by suitable devices attached to the engine or cars. It forms a portion of the circuit of the starting magnet $s^2$, and carries at its free end a conducting finger, $t^4$, which acts when the plate is depressed against the plate $t^5$, to close the circuit. In order to prolong the contact and insure the completion of the circuit the plate $t$ is attached at its free end to a piston, $t^6$, mounted in a closed cylinder, $t^7$, having a restricted air inlet, $t^8$, so that the ascent of the piston and plate are retarded.

Figure 20:
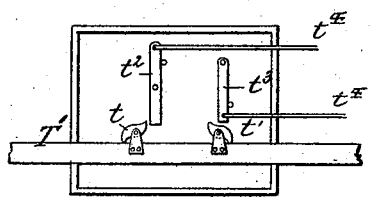

When the signal box is used in connection with a switch or signal the starting lever S, may be operated by a wire leading from a device such as shown in Fig. 20. In this figure T' represents a bar connected to and movable with the switch or signal, and carrying gravitating pivoted pawls $i\,i'$, facing in opposite directions and arranged to act on pivoted levers $i^2$ and $i^3$, from which wires $i^4$, lead to the starting pawl S. As the bar is moved to and fro it operates the levers and causes the signal box to be started.

Figure 21:
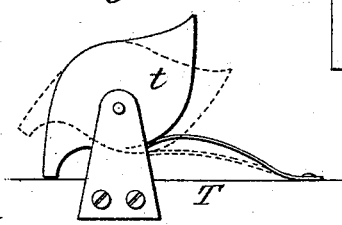
Figure 22:
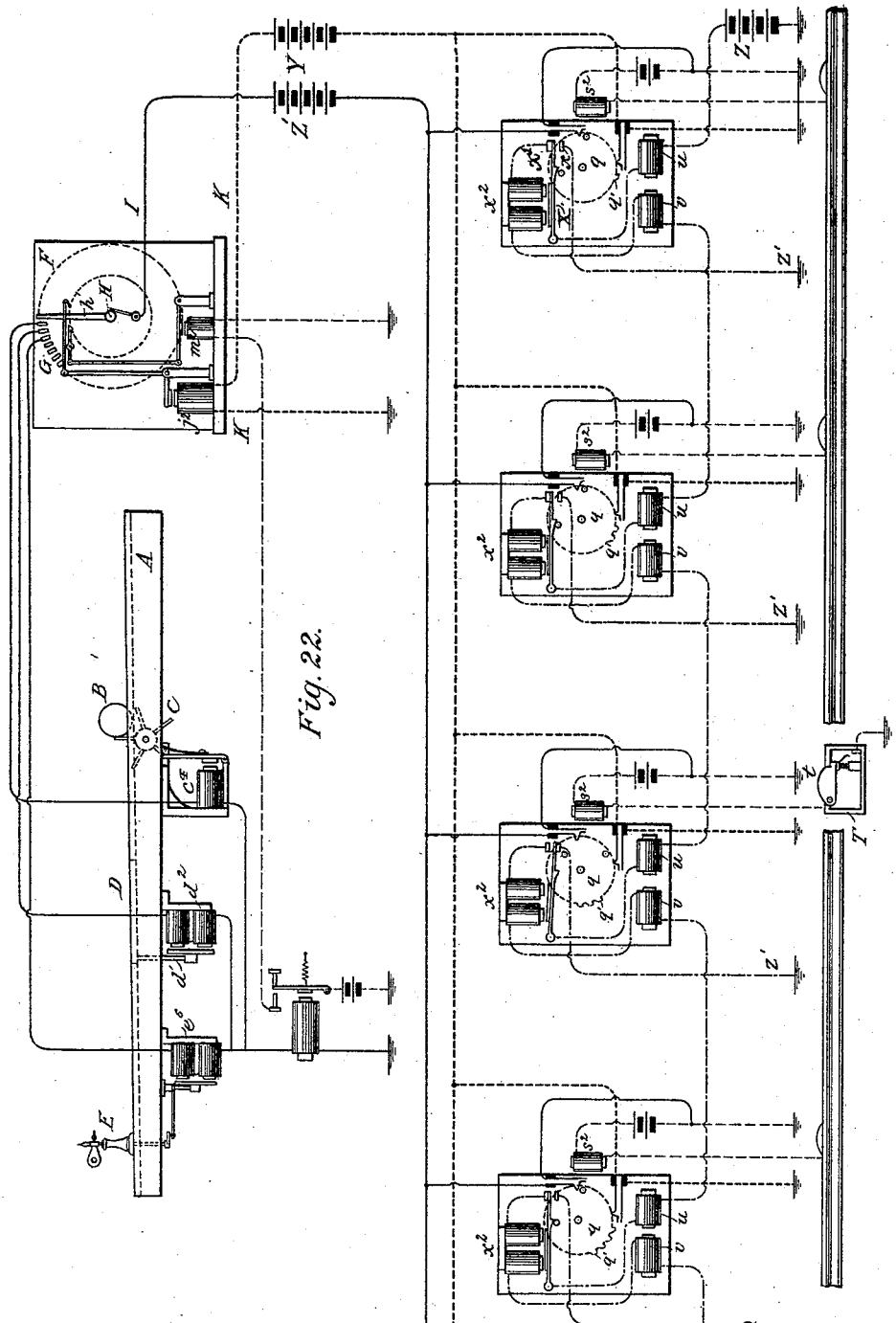

Manifestly spring-actuated pawls, such as shown in Fig. 21, or of any other suitable construction, may be substituted for the gravity pawls above described, but I prefer the latter in view of the liability of the springs to break and render the pawls inoperative.

Figure 19:
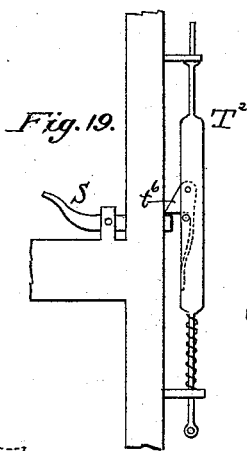

In Fig. 19 is shown a longitudinally-movable spring-seated bar $T^2$, which is designed to be connected with, and operated by the bar T' when the latter is moved in setting the switch or signal. The bar $T^2$ carries a spring dog $t^6$ which engages the rear end of the detent S, and throws the latter out of action to start the signal box, as already explained.

The skilled mechanic will perceive that in place of the contrivances above described, any equivalent devices for tripping the signal boxes into action may be used without departing from the spirit of my invention or affecting the general mode of operation.

In order to prevent interference in the event of two signal boxes being operated at the same time I provide in the signal box the devices shown in Figs. 12, 13 and 16. U and V are two armature levers so located that their ends may be thrown into or out of the path of the escapement lever $r^3$, by which the motion of the signal box is controlled. The lever U is so balanced that its point is normally in the path of the escapement lever, while the arm V is so weighted that its end is normally below the escapement lever. The depending ends of these two levers are provided with armatures in the field of the electro-magnets $u$ and $v$ respectively. When both magnets are active they reverse the position of the levers U, V, the former being drawn out of the path of the escapement lever while the latter is drawn into its path. In order that the box may be free to operate it is necessary that the magnet $u$ should alone be active. The non-interference circuit enters the box at the lower right-hand corner, and follows around the same in the course indicated by the dotted line, through the magnet $u$, thence through the switch arm X, and thence either through contact $x$ to the ground or contact $x'$ and magnets $x^2$ to the next signal box. The non-interference circuit is grounded at the central station and has no other ground connection except the contacts $x$, and the box. When this ground connection is made at a box the current of course passes to the ground and this at the box nearest the station, thus cutting off all boxes beyond. The switch X is maintained normally in contact with $x'$, so as to maintain the non-interference circuit throughout the system of boxes, as shown in Fig. 15, by means of a pin, $x^5$, on the wheel Q, which acts against an inclined shoulder, $x^6$, on the under side of the switch-arm. The last action in the box after sending the signal is the lifting of the switch X by the pin $x^5$, and the parts come to a rest in this position with the switch upheld by the pin. The instant that the box is started the pin releases the switch so that it may fall and ground the box.

It is manifest that if the pin $x^5$, were the only means of maintaining the switch to close the circuit the starting of any one box would cut off all the boxes beyond it in the system whether they were operating or not, and thus would interrupt any signal that was being given and disarrange the whole system. It is to avoid the possibility of this occurrence that the magnet $x^2$, is placed above the switch, and the latter provided with an armature. When this magnet is active it holds the switch in its upper and closed position, and as it will be active when the current is grounded at any box beyond it the grounding through $x$ is prevented. As soon as the ground connection is broken in the box that is operated by the pin lifting the switch the current is of course broken and all the magnets become inactive. All the switches X in the system will fall in the boxes that have been started and the box nearest the station will cut off all others until it has completed its signal when the current will pass through to the next box, and so on through the system until the boxes have sent their signals in succession.

The complete system.

Having described the several elements of my system, attention is directed to the diagram, Fig. 22, in which they will be found in their operative relations and connections. The parts represented in the preceding description are indicated by like letters in the diagram, and the several circuits are shown by lines of the character indicated by the legend on the drawings.

As will be seen in the diagram, each of the impulse circuits K, is extended from the ground through the adjacent signal box, thence through battery Y, and the impulse magnet $J^2$, of the multiple switch to the ground. The non-interference circuit is extended from the ground through battery Z, thence through the non-interference magnets to the several boxes each of which is provided with a ground connection $Z'$, for said circuit. The signal circuits are extended from the ground adjacent to the signal boxes through the latter and through battery $Z'$, and the multiple switch to the indicator.

In operation, the starting of the box by the local connections from the train switch or signal is followed by the transmission of the successive impulses by the box over the impulse circuit to set the multiple switch and establish the proper connection between the box and the appropriate magnet of the indicator. This is followed by the transmission of the signal impulse from the signal box through the conductor $h$, of the multiple switch to the indicator magnet, causing a suitable movement in the indicator to show the change which has taken place upon the road. After the transmission of the signal the parts are automatically returned to their normal positions.

Having thus described my invention, what I claim is—

1. The combination of the inclined table having in its surface channels or guides representing a railway track, with balls thereon independently movable in said channels or guides, to represent the movement of trains, and magnetic escapements arranged at intervals on said miniature track to control the movements of the balls.

2. In combination with the inclined table and the balls thereon, the revolving wheel with arms, the actuating pawl, the magnet and spring to operate the same, and the stop-arm $c^5$, to arrest the rotation of the wheel.

3. In a railway signaling and indicating apparatus the combination of a miniature representation of the track and switches to be signaled, movable devices thereon to represent trains, escapements on the miniature track to control the movements of said devices, and electric connections between the railway track and the signaling apparatus to control the switches and escapements of the latter by the movements of the switches and trains of the former.

4. The signaling apparatus comprising a miniature track and switch, movable devices thereon to represent trains, magnetic escapements arranged at intervals on said miniature track to control said movable devices, a double armature connected with the switch, double magnets acting on said armature, and electric connections for energizing said magnets to move the switch in either direction.

5. In a railway signal, an indicator consisting of a miniature representation of a section of track, and containing a series of movable devices to represent the position of the trains and switches, electro-magnets to control the respective devices, an electric conductor, an intermediate multiple switch to connect said conductor with the respective magnets of the indicator, and a series of signal boxes each adapted to transmit a distinctive number of impulses, and electrically connected with the signal to set the same in different positions.

6. In a railway signal system, an indicator provided with movable devices to represent the positions of the trains and switches magnetic escapements arranged at intervals, and electro-magnets for operating the escapements to control the movements of said movable devices, in combination with a series of signal boxes each intended to operate a corresponding magnet in the indicator, and an intermediate multiple switch mechanism controlled by the signal boxes and acting to establish communication with the corresponding magnets of the indicator.

7. In an electric signaling system, the combination of a series of signal boxes adapted to be operated by the switches and trains, and each transmitting a distinctive number of impulses, a multiple switch connected by a conductor with said signal boxes to be set in different positions by their action, and an indicator having movable devices to represent the trains and switches, and electro-magnets to operate said devices connected with the movable switch, and a signal circuit connected with the boxes and acting to transmit a signal impulse thence through the multiple switch to the appropriate magnets of the indicator: whereby the operation of a signal box is caused, first, to set the switch and establish electrical communication with the appropriate indicator magnet, and thereafter to transmit a signal impulse to said magnet, thereby causing the indicator to show the movement of the train or switch by which the signal box was actuated.

8. In a multiple signal switch, the series of contacts G, the rotary conducting-arm, its returning spring, the ratchet wheel J, the two pawls engaging said wheel, the magnets connected with and operating the respective pawls, and the spring-actuated arm N, adapted to lock the pawls automatically out of engagement and to be in turn disengaged by the backward rotation of the wheel.

9. In combination with a circular series of contacts, the rotary conducting arm, its returning spring, the wheel J, the two pawls and their magnets for turning the wheel forward and releasing the same that it may return under the influence of the spring, the conductor communicating with arm $h$, and the connection from said conductor to the armature of magnet $m^3$, whereby the release of the wheel is caused to interrupt the circuit.

10. In a railway signal system, the signal box having the spring actuated signaling-wheel $q$, in combination with the escapement wheel and pallet geared thereto, the armature levers U and V, arranged to stand normally one in and the other out of the path of the pallet arm, and the two electro-magnets for reversing the position of said arms.

11. In a signal apparatus, the combination of an electrically operated multiple switch, a signal wheel, a circuit connecting said wheel and switch, an impulse magnet in said circuit and connections for setting the switch, a signaling or indicating mechanism, a second circuit leading to the signaling mechanism through the switch, a magnet and connections for operating the signal, and circuit closing devices adapted to be operated by the signal wheel after the switch is set.

12. The combination with the spring-actuated signal wheel, the time escapement connected therewith, the two non-interference magnets and their armature levers to control the escapement, the switch X, connecting alternately with the ground connection and the line circuit, a pin in the gear train to lift said switch from the ground connection and the electro-magnet $x^2$, to hold the switch in its lifted position.

In testimony whereof I hereunto set my hand, this 4th day of March, 1891, in the presence of two attesting witnesses.

HOWARD ST. CLAIR WAIT.

Witnesses:
MYNDERT A. VOSBURGH,
CHAS. B. HOBBS.